July 6, 1948.                G. A. KENNEDY ET AL                2,444,653
                                DRILL PIPE CLEANER
                              Filed June 18, 1945

INVENTOR.
GROSVENOR A. KENNEDY
and
BY   CHARLES O. MOORE.

Martin E. Anderson
ATTORNEY.

Patented July 6, 1948

2,444,653

UNITED STATES PATENT OFFICE 2,444,653

DRILL PIPE CLEANER

Grosvenor A. Kennedy and Charles O. Moore, Denver, Colo., assignors to Gates Rubber Company, Denver, Colo., a corporation of Colorado Application June 18, 1945, Serial No. 600,194

1 Claim. (Cl. 15—210)

This invention relates to improvements in pipe wipers.

In the drilling of wells by means of rotary drills, a drill fluid is employed and it is therefore necessary to provide means for wiping the pipes and cleaning off the fluid whenever the drill pipe is withdrawn from the hole.

It is customary to insert the pipe through a snugly fitting hole in a rubber disk positioned directly beneath the rotary drill table bushing, whereby a wiping action takes place when the drill pipe is raised by the hoist. Since such wipers are flat rubber disks with round holes, they fail to wipe the pipes clean on all sides because the pipe sways from side to side with the result that the hole is stretched out of round and forms an opening on one side of the pipe which allows drill fluid to pass the wiper.

It is the object of this invention to produce a wiper that will prevent the passing of fluid when the pipe sways and which will therefore clean the pipe on all sides at all times.

This invention, briefly described, consists in forming the rubber disk with a conical center, the top of the cone being cut away to form a hole through which the pipe passes. When the pipe sways the conical projection moves in the same direction and this prevents the hole from being stretched out of round.

When the hole wears so that it will no longer clean the smaller diameter pipes, a portion of the cone can be cut away to produce a larger hole which will fit a larger size pipe.

Having thus, in a general way, described the invention and its objects, the invention will now be described in detail and for this purpose reference will be had to the accompanying drawing in which it is illustrated, in which.

Figure 1:
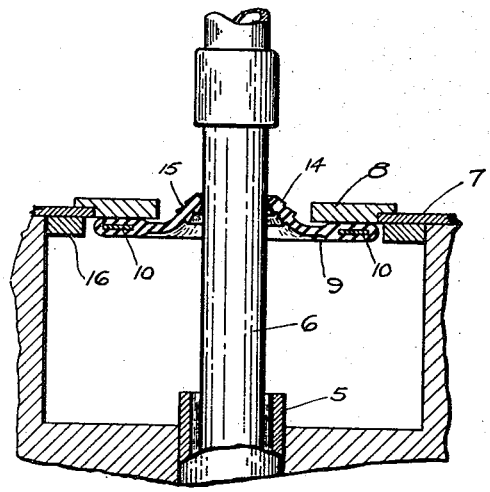
Figure 1 is a section through the top of an oil well showing the pipe cleaner in place.

Referring now to the drawings, reference numeral 5 designates a well casing in which the drill pipe 6 is positioned. The rotary table has been designated by reference numeral 7 and this is provided with a central opening in which is positioned a removable bushing 8. The wiper which forms the subject of this invention has been designated by reference numeral 9 and is shown in position against the under surface of the bushing. When the pipe is moved upwardly, for the purpose of withdrawing it from the drill hole, the conical central portion of the wiper will extend upwardly in the manner shown in Figure 1.

Figure 2:
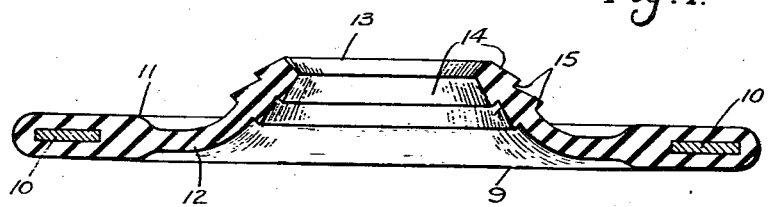
Figure 2 is a diametrical cross section through the improved cleaner.
Figure 3:
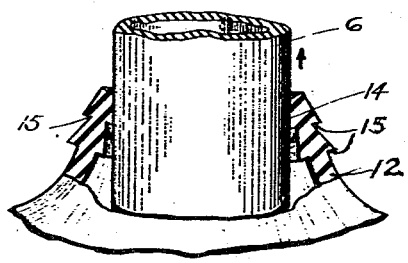
Figure 3 is a fragmentary section showing the disk in position on a pipe.

Referring now to Figure 2, which is a diametrical cross section of the wiper, reference numeral 10 designates a metal ring that may be provided, if desired, and about which the material forming the wiper is molded. A portion of the wiper extending from the periphery to point 11 is usually flat and the inner edge of this annular flat portion terminates in an upwardly curved conical portion 12 of slightly less thickness. The cone thus formed is truncated forming a central opening whose wall has been designated by reference numeral 13. Surrounding the opening are flattened inclined surfaces 14 that terminate in walls 15 that are perpendicular to the conical surfaces 14, there being two such ribs or inclined surfaces on each side as shown in the drawing. The diameter of the hole in the conical portion is somewhat less than the diameter of pipe 6 so that when the disk is in place on a pipe, it will stretch and bring the inner inclined surface 14 into engagement with the outer surface of the pipe as shown in Figure 3. Due to the fact that the material is formed into a cone with the opening in the top of the cone, it is evident that when the pipe starts swaying during the withdrawing operation, it merely bends the conical portion from side to side without exerting sufficient pressure to distort the opening through which the pipe passes and therefore the wiping surface 14 will always be in contact with the pipe, even when the latter sways to a considerable extent. This feature of the construction is of great importance because, as above pointed out, if no provision is made for compensating for the swaying effect, the hole through which the pipe passes will be distorted, leaving an open space on one side through which the drilling fluid may pass. With this construction the surface 14 is always in contact with the entire pipe surface and therefore cleans the entire surface regardless of any sway that may take place.

Since walls 15 are substantially perpendicular to inclined surface 14 sharp corners are formed that effectively scrape and clean the pipe.

The fact that the wiper is constructed with a frusto-conical central part makes it possible to get more wiping surface into contact with the pipe with the same amount of stretching of the material than can be effected with a normally flat wiper and this results in longer life for the wiper and more effective wiping action.

When the opening at the top of the conical projection has worn to such an extent that it will no longer function properly in connection with the smaller drill pipe, the conical portion is cut along line 15 so as to remove the upper rib. The resulting opening is of a proper shape to fit the next larger pipe and can be used in connection with such larger pipes until it is worn sufficiently to prevent successful operation.

Since the disk is made of resilient flexible material, such as rubber or any other material having rubber-like characteristics, it is evident that the conical portion can be moved from one side to the other. However, during the time the pipe is removed, the cone will extend upwardly as the forces exerted thereon will move it in that direction.

The rotary table is usually provided with a shoulder 16 which limits sidewise movement of the disk to a predetermined amount. When the disk is provided with a metal ring 10, the bushing opening in the rotary table must be of sufficient size to admit the wiper.

When the pipe is to be withdrawn the upper end of the pipe is disconnected in the usual manner and supported from a hoist by proper means, whereupon the bushing 8 is removed, the wiper disk positioned over the pipe and the bushing 8 replaced.

Having described the invention, what is claimed as new is:

In a drill pipe cleaner of the type comprising a reenforcing member in the form of a flat metal ring and a wiper member of resilient rubber composition entirely enclosing the reenforcing member, the wiper member having normally a central truncated conical projection on one side apertured for the reception of the drill pipe, both surfaces of said projection being provided with at least two concentric ribs whose sides taper inwardly towards the opening and whose end walls are substantially perpendicular to the median plane of the conical projection, the intersection of the two angularly related surfaces of the ribs forming a sharp corner for separating slime from the pipe when it is moved in the direction of the conical projection.

GROSVENOR A. KENNEDY.
CHARLES O. MOORE.

REFERENCES CITED

The following references are of record in the file of this patent:

UNITED STATES PATENTS

| Number | Name | Date |
|---|---|---|
| 2,198,698 | Fitzmeyer | Apr. 30, 1940 |
| 2,272,395 | Ballagh | Feb. 10, 1942 |
| 2,305,353 | Jacobs | Dec. 15, 1942 |